United States Patent
Wang

(10) Patent No.: US 11,475,089 B2
(45) Date of Patent: Oct. 18, 2022

(54) METHOD AND APPARATUS FOR DISPLAYING SEARCH PAGE, TERMINAL AND STORAGE MEDIUM

(71) Applicant: Beijing Microlive Vision Technology Co., Ltd, Beijing (CN)

(72) Inventor: Xiao Wang, Beijing (CN)

(73) Assignee: Beijing Microlive Vision Technology Co., Ltd, Beijing (CN)

( * ) Notice: Subject to any disclaimer, the term of this patent is extended or adjusted under 35 U.S.C. 154(b) by 0 days.

(21) Appl. No.: 16/967,561

(22) PCT Filed: Dec. 28, 2018

(86) PCT No.: PCT/CN2018/124772
§ 371 (c)(1),
(2) Date: Aug. 5, 2020

(87) PCT Pub. No.: WO2020/007012
PCT Pub. Date: Jan. 9, 2020

(65) Prior Publication Data
US 2021/0216604 A1 Jul. 15, 2021

(30) Foreign Application Priority Data
Jul. 6, 2018 (CN) .......................... 201810737009.9

(51) Int. Cl.
*G06F 3/048* (2013.01)
*G06F 16/9538* (2019.01)
(Continued)

(52) U.S. Cl.
CPC ........ *G06F 16/9538* (2019.01); *G06F 3/0482* (2013.01); *G06F 3/0484* (2013.01); *G06F 16/9535* (2019.01)

(58) Field of Classification Search
CPC .. G06F 3/0484; G06F 3/0482; G06F 16/9538; G06F 16/9535
See application file for complete search history.

(56) References Cited

U.S. PATENT DOCUMENTS 8,162,758 B1* 4/2012 Powers .............. H04N 21/4756
705/12
9,354,811 B2* 5/2016 Chaudhri .............. G06F 3/0482
(Continued)

FOREIGN PATENT DOCUMENTS

CN 104133617 A 11/2014
CN 104462423 A 3/2015
(Continued)

OTHER PUBLICATIONS https://www.youtube.com/watch?v=7k_GTZpdrOw ,Published on Dec. 25, 2017 (Year: 2017).*
(Continued)

*Primary Examiner* — Mahelet Shiberou
(74) *Attorney, Agent, or Firm* — BakerHostetler

(57) ABSTRACT

Provided are a method for displaying a search page, an apparatus for displaying a search page, a terminal and a storage medium. The method includes: in response to a first preset operation on a search control in a current display interface, switching the current display interface to a search interface and displaying at least one subject of recommended content in the search interface; and in response to a second preset operation on a target subject of recommended content, jumping to a detail page corresponding to the target subject of recommended content.

11 Claims, 4 Drawing Sheets

(51) Int. Cl.
*G06F 16/9535* (2019.01)
*G06F 3/0482* (2013.01)
*G06F 3/0484* (2022.01)

(56) References Cited

U.S. PATENT DOCUMENTS

| | | | | |
|---|---|---|---|---|
| 10,489,733 | B2* | 11/2019 | Raack | G06Q 10/0637 |
| 10,789,285 | B2* | 9/2020 | Beaumier | G06F 16/64 |
| 2006/0218502 | A1* | 9/2006 | Matthews | G06F 3/0482 |
| | | | | 715/779 |
| 2007/0244749 | A1* | 10/2007 | Speiser | G10H 1/361 |
| | | | | 705/14.39 |
| 2015/0026157 | A1* | 1/2015 | Kruzeniski | G06T 13/80 |
| | | | | 707/722 |
| 2015/0222945 | A1* | 8/2015 | Jackson | H04N 21/2743 |
| | | | | 725/61 |
| 2016/0360336 | A1* | 12/2016 | Gross | H04M 1/72403 |
| 2016/0360382 | A1 | 12/2016 | Gross et al. | |
| 2018/0081500 | A1* | 3/2018 | Erant | G06Q 10/10 |

FOREIGN PATENT DOCUMENTS

| | | |
|---|---|---|
| CN | 104572846 A | 4/2015 |
| CN | 104572853 A | 4/2015 |
| CN | 104866566 A | 8/2015 |
| CN | 104899276 A | 9/2015 |
| CN | 108984073 A | 12/2018 |
| CN | 109240588 A | 1/2019 |
| JP | 2014-132458 A | 7/2014 |
| JP | 2018-523102 A | 8/2018 |

OTHER PUBLICATIONS

International Patent Application No. PCT/CN2018/124772; Int'l Search Report; dated Apr. 4, 2019; 13 pages.
"How to challenge Douyin"; https://jinqyan.baidu.com/articie/d5c4b52b9f4b58da560dc5f1.html; Nov. 2017; Baidu; © 2020; accessed Jul. 22, 2020; 28 pages.

* cited by examiner

METHOD AND APPARATUS FOR DISPLAYING SEARCH PAGE, TERMINAL AND STORAGE MEDIUM

The present application is a National Stage application of PCT international patent application PCT/CN2018/124772, filed on Dec. 28, 2018 which claims priority to Chinese Patent Application No. 201810737009.9, filed on Jul. 6, 2018 with the Chinese Patent Office, both of which are incorporated herein by reference in their entireties.

FIELD

The present disclosure relates to the field of internet technology, for example, to a method for displaying a search page, an apparatus for displaying a search page, a terminal and a storage medium.

BACKGROUND

With the development and the popularity of internet technologies and intelligent devices, users can conveniently use multiple types of clients to search for content of interest to them.

According to relative technologies, when a user performs search by use of a client software, in order to attract the user and improve a search efficiency, a server may push current top search terms to the client and the top search terms may be displayed under a search box on a search interface. In a case that the user is interested in a certain top search term, the user may click the top search term and then search results obtained based on the top search term are provided. Further, the user may search for content of interest to himself among the search results.

Although top search terms are recommended in this process, the user needs to search for content of interest to himself among the search results corresponding to the top search term, that is, a secondary search needs to be performed, which results in a complex user operation, a low recommendation efficiency and search efficiency, and a poor user experience.

SUMMARY

Below is a summary of the subject described in detail in the present disclosure. The summary does not intend to limit the protection scope of claims.

According to embodiments of the present disclosure, a method for displaying a search page, an apparatus for displaying a search page, a terminal and a storage medium are provided to solve the problems, such as a complex user operation, a low recommendation efficiency and search efficiency, in conventional technologies.

In a first aspect, a method for displaying a search page is provided according to an embodiment of the disclosure. The method includes: in response to a first preset operation on a search control in a current display interface, switching the current display interface to a search interface and displaying at least one subject of recommended content in the search interface; and in response to a second preset operation on a target subject of recommended content, jumping to a detail page corresponding to the target subject of recommended content.

In a second aspect, an apparatus for displaying a search page is provided according to an embodiment of the disclosure. The apparatus includes a switch display module and a jump display module. The switch display module is configured to, in response to a first preset operation on a search control in a current display interface, switch the current display interface to a search interface and display at least one subject of recommended content in the search interface. The jump display module is configured to, in response to a second preset operation on a target subject of recommended content, jump to a detail page corresponding to the target subject of recommended content.

In a third aspect, a terminal is provided according to an embodiment of the disclosure. The terminal includes at least one controller and a memory. The memory is configured to store at least one program. The at least one program, when executed by the at least one controller, causes the at least one controller to perform the method for displaying a search page according to any one of embodiments of the disclosure.

In a fourth aspect, a computer readable storage medium storing computer programs is provided according to an embodiment of the disclosure. The computer programs, when executed by a processor, cause the processor to perform the method for displaying a search page according to any one of embodiments of the disclosure.

Other aspects of the disclosure may be learned after detail descriptions and drawings are read and understood.

DETAILED DESCRIPTION

The present disclosure is described in detail below in conjunction with drawings and embodiments. It should be understood that specific embodiments described here are used to explain the present disclosure, but not to limit the present disclosure. It also should be noted that, for easy of description, the drawings merely show partial structures related to the present disclosure rather than all structures.

Figure 1A:
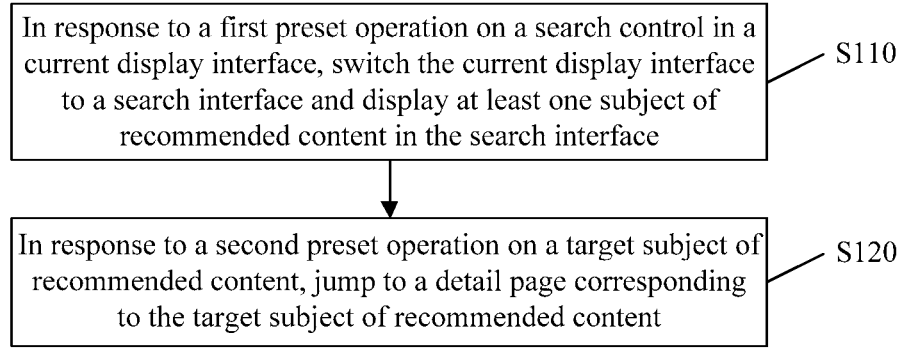
FIG. 1a is a schematic flowchart of a method for displaying a search page according to an embodiment of the present disclosure.

FIG. 1a is a flowchart of a method for displaying a search page according to an embodiment of the present disclosure. The present embodiment may be applied to a case that current hot search content is recommended to users when users are searching. The method may be performed by an apparatus for displaying a search page. The apparatus for displaying a search page may be implemented in at least one of a software manner and a hardware manner. The apparatus may be provided in any terminal with a network communication function and cameras, such as a smart phone and a tablet computer.

As shown in FIG. 1a, the method for displaying a search page according to an embodiment of the present disclosure may include step S110 and step S120.

In step S110, in response to a first preset operation on a search control in a current display interface, the current display interface is switched to a search interface and at least one subject of recommended content is displayed in the search interface.

According to an embodiment of the present disclosure, the first preset operation or a second preset operation may be any one of a click operation, a double click operation or a long press operation, which are not limited herein.

Figure 1B:
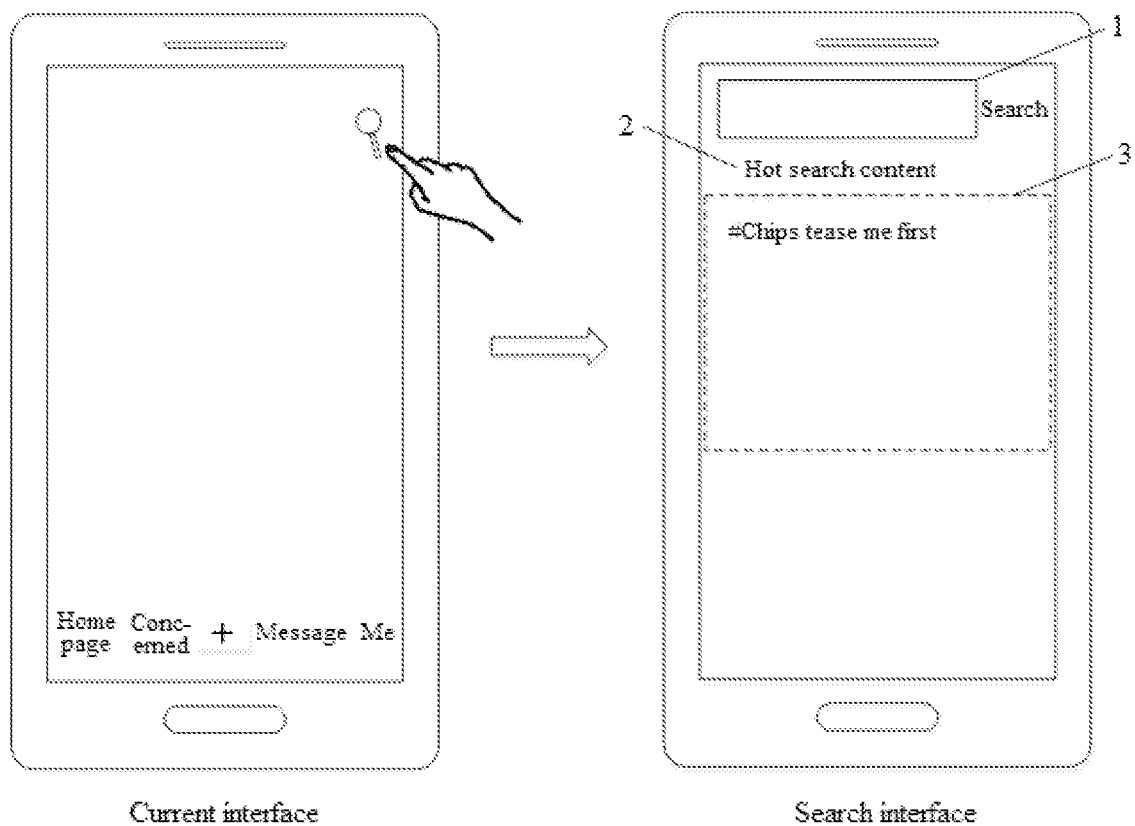
FIG. 1b is a schematic diagram showing an effect of switching a current display interface to a search interface according to an embodiment of the present disclosure.

For example, the first preset operation may be a click operation. In a process that a current user searches by a client, when it is detected that the current user clicks the search control in the current display interface, the current display interface is switched to the search interface. The current display interface is, for example, a video play interface. For example, reference is made to FIG. 1b, which is a diagram showing an effect of switching the current display interface to a search interface. A search box 1 is displayed in the search interface, so that the user may search by entering keywords in the search box. A label 2 for recommended content is arranged under the search box. For example, according to the present embodiment, recommended content is hot search content, namely content with search popularity greater than a certain threshold among the content searched by uses. A first display area 3 is arranged under the label 2, to display at least one subject of recommended content, recommended by the server, for the current user.

It should be also noted that, according to the present embodiment, it is only an example in which top search content is taken the recommended content, which is not limited in the present disclosure.

The subject of recommended content recommended by the server to the current user may be obtained as follow. The server obtains partial recommended content with high ranked search frequency, based on search histories of the whole network users. The obtained partial recommended content is pushed to the current user as the most interested content by the whole network users. Alternatively, it may also be determined whether a topic may act as the recommended content according to comprehensive weights of the topic generated by whole network users. For example, the recommended content is determined according to the quantity of thumping up, the quantity of comment and the quantity of forwarding for a topic generated by whole network users. Alternatively, interests and preferences of the current user may be determined according to search histories of the current user, and then recommended content what the current user likes are recommended to the current user. The recommended content may be hot challenges or hot music.

In step S120, in response to a second preset operation on a target subject of recommended content, it is jumped to a detail page corresponding to the target subject of recommended content.

Figure 1C:
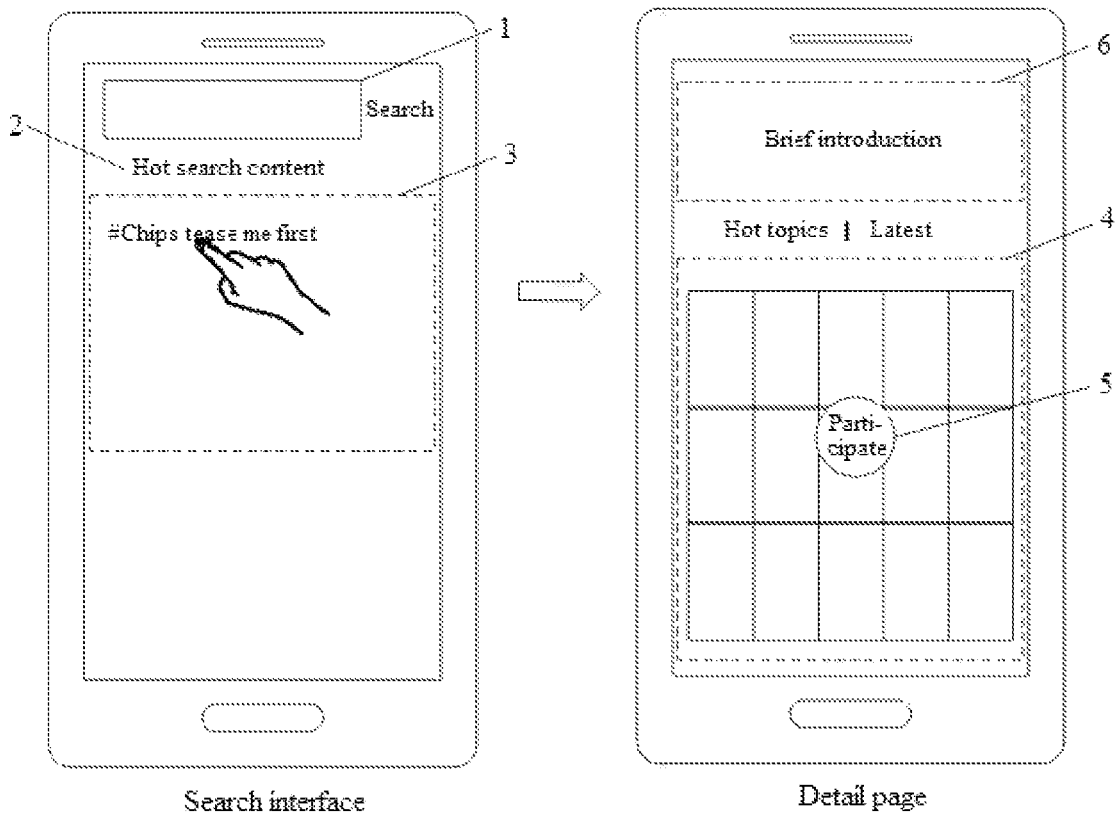
FIG. 1c is a schematic diagram showing an effect of jumping from a search interface to a detail page corresponding to a target subject of recommended content according to an embodiment of the present disclosure.

According to the present embodiment, the second preset operation may be a click operation, the target subject of recommended content may be any one subject of recommended content displayed on the first display area 3. When it is detected that the current user clicks the target subject of recommended content, it is jumped from the search interface to the detail page corresponding to the target subject of recommended content. For example, reference is made to FIG. 1c, which is a diagram showing an effect of jumping from the search interface to a detail page corresponding to a target subject of recommended content. When it is detected that the current user clicks the subject of "chips tease me first", it is jumped to the detail page corresponding to the subject of "chips tease me first". A second display area 4 is provided on the detail page corresponding to the subject of "chips tease me first" and the second display area is configured to display video thumbnails uploaded by other users in the whole network. The current user may view video details corresponding to a dynamic thumbnail of a video by clicking the dynamic thumbnail of the video. A participation control 5 is provided in the detail page corresponding to the subject of "chips tease me first". The current user may enter a shoot interface by clicking the participation control 5 to shoot a video with the subject of "chips tease me first".

According to the present embodiment, in response to the click operation performed by the user on the search control, the current display interface is switched to the search interface and the recommended content is displayed in form of subject in the search interface. When the user clicks any subject of the recommended content, it is jumped to the detail page corresponding to the subject directly, thereby simplifying the user operation, improving the user search efficiency and the user experience.

Figure 2A:
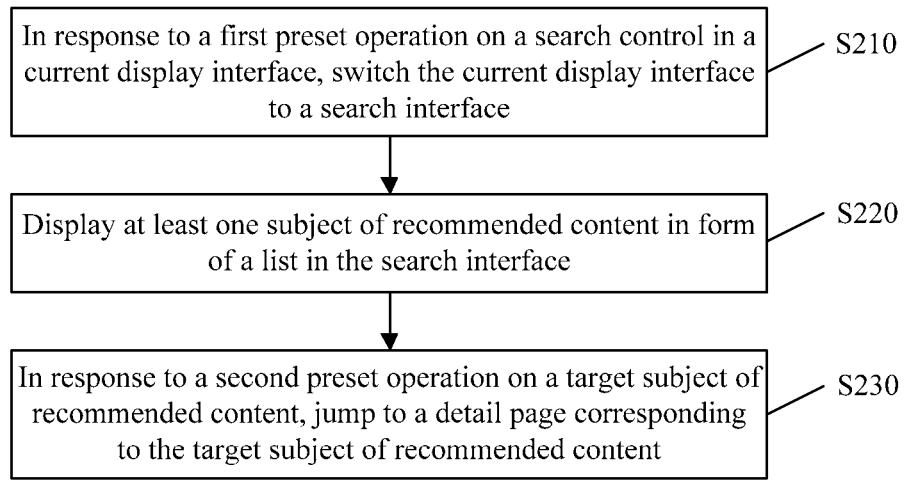
FIG. 2a is a schematic flowchart of a method for displaying a search page according to an embodiment of the present disclosure.

FIG. 2a is a schematic flowchart of a method for displaying a search page according to an embodiment of the present disclosure. The present embodiment is a refinement based on above-mentioned embodiment, as shown in FIG. 2a, the method for displaying a search page according to this embodiment may include step S210, step S220 and step S230.

In step S210, in response to a first preset operation on a search control in a current display interface, the current display interface is switched to a search interface.

In step S220, at least one subject of recommended content is displayed in form of a list in the search interface.

Figure 2B:
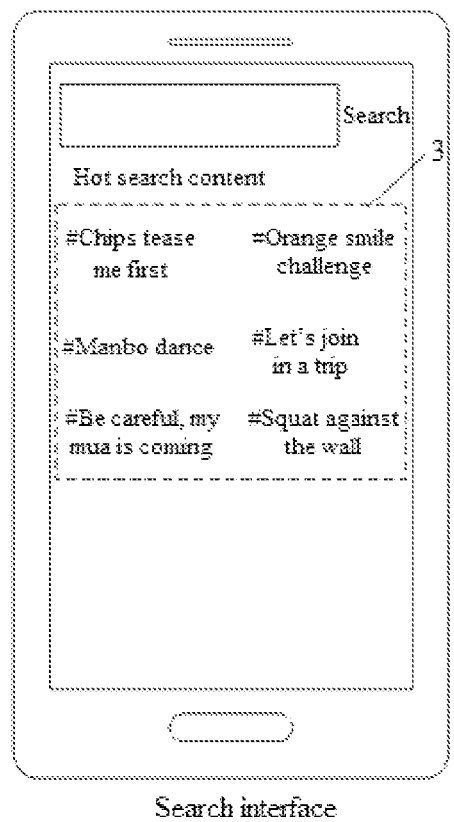
FIG. 2b is a schematic diagram showing an effect of displaying subjects of recommended content in a first display area of a search interface according to an embodiment of the present disclosure.

According to the present embodiment, in a case that the terminal receives multiple subjects of recommended content recommended by the server, the multiple subjects of recommended content are displayed in form of a list in the search interface. For example, reference is made to FIG. 2b, which is a diagram showing an effect of displaying subjects of recommended content in the first display area 3. The recommended content is displayed in form of information flow. For example, the subjects of recommended content are displayed in two columns. In other embodiments, the subjects of recommended content may be displayed in three columns or in other list format, which is not limited here.

In step S230, in response to a second preset operation on a target subject of recommended content, it is jumped to a detail page corresponding to the target subject of recommended content.

According to the present embodiment, in response to the click operation performed by the user on the search control, the current display interface is switched to the search interface and the subjects of recommended content in the network are displayed in form of a list in the search interface. When the user clicks any subject of the recommended content, it is jumped to the detail page corresponding to the subject directly, thereby simplifying the user operation, improving the user search efficiency and the user experience.

Figure 3:
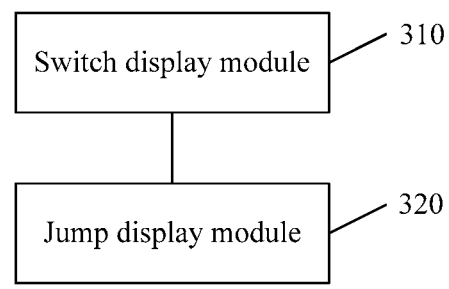
FIG. 3 is a schematic structural diagram of an apparatus for displaying a search page according to an embodiment of the present disclosure.

FIG. 3 is a schematic structural diagram of an apparatus for displaying a search page according to an embodiment of the present disclosure. As shown in FIG. 3, the apparatus includes a switch display module 310 and a jump display module 320.

The switch display module 310 is configured to, in response to a first preset operation on a search control in a current display interface, switch the current display interface to a search interface and display at least one subject of recommended content in the search interface.

The jump display module 320 is configured to, in response to a second preset operation on a target subject of recommended content, jump to a detail page corresponding to the target subject of recommended content.

According to the apparatus for displaying a search page provided in present embodiment, the switch display module 310, in response to the click operation performed by the user on the search control, switches the current display interface to the search interface and display the subjects of recommended content in the network in form of a list in the search interface. When the user clicks any subject of the recommended content, it is jumped to the detail page corresponding to the subject directly through the jump display module 320, thereby simplifying the user operation, improving the user search efficiency and the user experience.

On the basis of the above-mentioned embodiments, a search box is also displayed in the search interface. Accordingly, the at least one subject of recommended content is displayed under the search box.

On the basis of the above-mentioned embodiments, the switch display module 310 includes a display unit configured to display the at least one subject of recommended content in form of a list in the search interface.

On the basis of the above-mentioned embodiments, the recommended content includes hot challenges or hot music determined based on search histories of all users.

On the basis of the above-mentioned embodiments, the first preset operation or the second preset operation includes a click operation, a double click operation or a long press operation.

The apparatus for displaying a search page according to embodiments of the present disclosure can perform the method for displaying a search page according to any one embodiment of the present disclosure, and has function modules for performing the method.

Figure 4:
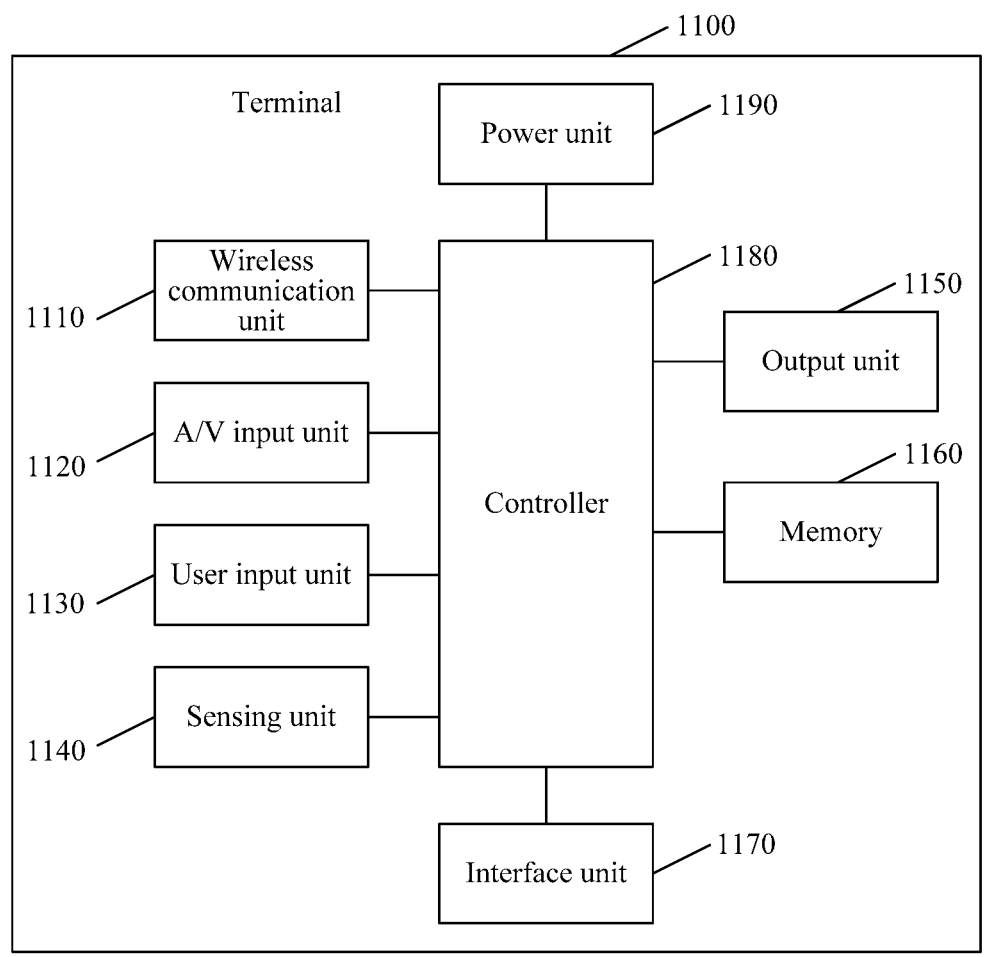
FIG. 4 is a schematic structural diagram of a terminal according to an embodiment of the present disclosure.

FIG. 4 is a schematic diagram showing the hardware structure of a terminal according to an embodiment of the present disclosure. The terminal may be implemented in various manners. The terminal in the embodiment of the disclosure may include, but is not limited to, mobile terminal devices such as a mobile phone, a smart phone, a notebook computer, a digital broadcast receiver, a Personal Digital Assistant (PDA), a tablet computer, a Portable Media Player (PMP), a navigation device, an in-vehicle terminal device, an in-vehicle display terminal, an in-vehicle electronic rearview mirror and fixed terminal devices such as a digital TV, a desktop computer.

As shown in FIG. 4, the terminal 1100 may include a wireless communication unit 1110, an Audio/Video (A/V) input unit 1120, a user input unit 1130, a sensing unit 1140, an output unit 1150, a memory 1160, an interface unit 1170, a controller 1180, a power unit 1190, and the like. FIG. 4 shows a terminal with various components. However, it should be understood that it's not required to implement all shown components, more or less components may be implemented alternatively.

The wireless communication unit 1110 establishes wireless communication between the terminal 1100 and a wireless communication system or a network. The A/V input unit 1120 is configured to receive an audio signal or a video signal. The user input unit 1130 may generate input data based on a command inputted by a user, to control various operations of the terminal. The sensing unit 1140 is configured to detect a current state of the terminal 1100, a location of the terminal 1100, whether the user touches the terminal 1100 to generate an input, an orientation of the terminal 1100, an acceleration or deceleration movement and direction of the terminal 1100. In addition, the sensing unit 1140 is also configured to generate a command or signal for controlling operations of the terminal 1100. The interface unit 1170 is used as an interface by which at least one external device can connect with the terminal 1100. The output unit 1150 is configured to provide an output signal in at least one of a visual manner, an audio manner or a tactile manner. The memory 1160 may store the process executed by the controller 1180, software programs for controlling operations, or the like. The memory 1160 may also temporarily store data which has been outputted or which is to be outputted. The memory 1160 may include at least one type of storage medium. The terminal 1100 can collaborate with a network storage device which executes a storage function of the memory 1160 by network connections. The controller 1180 usually controls overall operations of the terminal. In addition, the controller 1180 may include a multimedia module configured to reappear or playback multimedia data. The controller 1180 may execute a pattern recognition process, to recognize a handwriting input or a picture drawing input performed on the touch screen as a character or an image. Under the control of the controller 1180, the power unit 1190 receives an external electric power or an inner electric power and provides a proper electric power for operating various elements and components.

The controller 1180 executes software programs stored in the system memory 1160 to control the overall operations of the terminal, for example, to perform a method for displaying a search page according to the embodiment of the disclosure. The method includes: in response to a first preset operation on a search control in a current display interface, switching the current display interface to a search interface and displaying at least one subject of recommended content in the search interface; and in response to a second preset operation on a target subject of recommended content, jumping to a detail page corresponding to the target subject of recommended content.

According to an embodiment of the present disclosure, a storage medium including computer executable instructions is provided. The computer executable instructions, when executed by a processor of a computer, cause the processor to perform the method for displaying a search page applied to a terminal. The method includes: in response to a first preset operation on a search control in a current display interface, switching the current display interface to a search interface and displaying at least one subject of recommended content in the search interface; and in response to a second preset operation on a target subject of recommended content, jumping to a detail page corresponding to the target subject of recommended content.

Apparently, for the storage medium including computer executable instructions provided according to the embodiment of the disclosure, the computer executable instructions are not limited to operations of the above method. The computer executable instructions can also execute relative operations in the text display method applied to the terminal according to any one of embodiments of the present disclosure.

The computer storage medium according to embodiments of the present disclosure may be any combination of at least one computer readable medium. The computer readable medium may be a computer readable signal medium or a computer readable storage medium. For example, the computer readable storage medium may be, but not limited to, an electronic, magnetic, optical, electromagnetic, infrared, or semiconductor system, apparatus, or device, or any combination of the above. More specific examples (non-exhaustive list) of the computer readable storage medium include: electrical connections having at least one wire, portable computer disk, hard disk, Random Access Memory (RAM), Read Only Memory (ROM), Electrically Erasable Programmable Read-Only Memory (EPROM) or flash memory, optical fiber, Compact Disc Read-Only Memory (CD-ROM), light storage device, a magnetic storage device, or any suitable combination of the above. In this disclosure, the computer readable storage medium may be any physical medium that contain or store programs. The programs may be used by an instruction execution system, an instruction execution apparatus or an instruction execution device or may be used in combination with the instruction execution system, the instruction execution apparatus and the instruction execution device.

The computer readable signal medium may include a data signal carrying computer readable program codes which are transmitted in a baseband or transmitted as a part of carrier. The transmitted data signal may has a variety of forms including, but not limited to, electromagnetic signals, optical signals, or any suitable combination of the foregoing. The computer readable signal medium may also be any other computer readable medium except for the computer readable storage medium. The computer readable medium can send, transmit or transfer programs configured to be used by an instruction execution system, an instruction execution apparatus or an instruction execution device or used in combination with the instruction execution system, the instruction execution apparatus and the instruction execution device.

The program codes included in the computer readable medium may be transferred by any proper medium including, but not limited to, wireless, electric wire, optical cable, RF and any proper combination of the above.

The computer program codes configured to perform the operations according to the present disclosure may be written in at least one programming language or the combination of the at least one programming language. The programming language includes object oriented programming language such as Java, Smalltalk, C++ and conventional procedural programming languages such as "C" programming language or programming languages similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

What is claimed is:

1. A method for displaying a search page, comprising:
   in response to a first preset operation on a search control in a current display interface, switching the current display interface to a search interface;
   displaying at least one subject of content recommended to a user in the search interface;
   in response to a second preset operation on a target subject of content recommended to the user, jumping to a detail page corresponding to the target subject of content, wherein the detail page corresponding to the target subject comprises a plurality of thumbnails corresponding to a plurality of videos, the plurality of videos being associated with the target subject and uploaded by a plurality users in a video network, and wherein the detail page corresponding to the target subject further comprises a participation control overlaid on at least one subset of the plurality of thumbnails; and
   in response to receiving user input on the participation control comprised in the detail page corresponding to the target subject, entering a shoot interface for shooting a video with the target subject.

2. The method according to claim 1, wherein a search box is displayed on the search interface, and the at least one subject of recommended content is displayed under the search box.

3. The method according to claim 1, wherein the displaying at least one subject of recommended content in the search interface comprises:
   displaying the at least one subject of recommended content in form of a list in the search interface.

4. The method according to claim 1, wherein the recommended content comprises hot challenges or hot music determined based on search histories of all users.

5. The method according to claim 1, wherein
   the first preset operation comprises a click operation, a double click operation or a long press operation; or
   the second preset operation comprises a click operation, a double click operation or a long press operation.

6. An apparatus for displaying a search page, comprising:
   at least one processor; and
   at least one memory communicatively coupled to the at least one processor and storing instructions that upon execution by the at least one processor cause the apparatus to:
   in response to a first preset operation on a search control in a current display interface, switch the current display interface to a search interface;
   display at least one subject of content recommended to a user in the search interface; and
   in response to a second preset operation on a target subject of content recommended to the user, jump to a detail page corresponding to the target subject of content, wherein the detail page corresponding to the target subject comprises a plurality of thumbnails corresponding to a plurality of videos, the plurality of videos being associated with the target subject and uploaded by a plurality users in a video network, and wherein the detail page corresponding to the target subject further comprises a participation control overlaid on at least one subset of the plurality of thumbnails; and
   in response to receiving user input on the participation control comprised in the detail page corresponding to the target subject, enter a shoot interface for shooting a video with the target subject.

7. The apparatus according to claim 6, wherein a search box is displayed on the search interface, and the at least one subject of recommended content is displayed under the search box.

8. The apparatus according to claim 6, wherein the at least one memory further stores instructions that upon execution by the at least one processor cause the apparatus to:

display the at least one subject of recommended content in form of a list in the search interface.

9. The apparatus according to claim 6, wherein the recommended content comprises hot challenges or hot music determined based on search histories of all users.

10. The apparatus according to claim 6, wherein
the first preset operation comprises a click operation, a double click operation or a long press operation; or
the second preset operation comprises a click operation, a double click operation or a long press operation.

11. A non-transitory computer readable storage medium, storing computer programs, wherein the computer programs, when executed by a processor, cause the processor to perform operations comprising:
in response to a first preset operation on a search control in a current display interface, switching the current display interface to a search interface;
displaying at least one subject of content recommended to a user in the search interface;
in response to a second preset operation on a target subject of content recommended to the user, jumping to a detail page corresponding to the target subject of content, wherein the detail page corresponding to the target subject comprises a plurality of thumbnails corresponding to a plurality of videos, the plurality of videos being associated with the target subject and uploaded by a plurality users in a video network, and wherein the detail page corresponding to the target subject further comprises a participation control overlaid on at least one subset of the plurality of thumbnails; and
in response to receiving user input on the participation control comprised in the detail page corresponding to the target subject, entering a shoot interface for shooting a video with the target subject.

* * * * *